United States Patent
Estabrooks et al.

(10) Patent No.: US 10,425,360 B2
(45) Date of Patent: Sep. 24, 2019

(54) FRONTPLANE COMMUNICATION NETWORK BETWEEN MULTIPLE PLUGGABLE MODULES ON A SINGLE FACEPLATE

(71) Applicant: Ciena Corporation, Hanover, MD (US)

(72) Inventors: Kevin Estabrooks, Nepean (CA); Daniel Rivaud, Ottawa (CA); Michael J. Windgrove, Ottawa (CA)

(73) Assignee: Ciena Corporation, Hanover, MD (US)

( * ) Notice: Subject to any disclaimer, the term of this patent is extended or adjusted under 35 U.S.C. 154(b) by 203 days.

(21) Appl. No.: 14/925,929

(22) Filed: Oct. 28, 2015

(65) Prior Publication Data

US 2017/0126589 A1 May 4, 2017

(51) Int. Cl.

| | |
|---|---|
| *H02J 5/00* | (2016.01) |
| *H04W 4/80* | (2018.01) |
| *H02J 50/12* | (2016.01) |
| *H02J 50/20* | (2016.01) |
| *H02J 50/30* | (2016.01) |
| *H04B 10/25* | (2013.01) |
| *H04L 12/24* | (2006.01) |
| *H04L 12/931* | (2013.01) |

(52) U.S. Cl.
CPC ............ *H04L 49/40* (2013.01); *H02J 5/005* (2013.01); *H04B 10/2504* (2013.01); *H04W 4/80* (2018.02); *H02J 50/12* (2016.02); *H02J 50/20* (2016.02); *H02J 50/30* (2016.02)

(58) Field of Classification Search
CPC . H04L 49/40; H04L 41/0663; H04B 10/2504; H04W 4/008; H02J 5/005
See application file for complete search history.

(56) References Cited

U.S. PATENT DOCUMENTS

| | | | |
|---|---|---|---|
| 9,594,716 B1* | 3/2017 | Nair ..................... | G06F 13/4068 |
| 2007/0294458 A1* | 12/2007 | Danilak .............. | G06F 13/4027 710/313 |
| 2009/0162051 A1* | 6/2009 | Hudgins ................ | H04B 10/40 398/9 |
| 2011/0182191 A1* | 7/2011 | Jackson .................. | H04L 43/10 370/250 |
| 2012/0155670 A1* | 6/2012 | Rutschman ......... | H04M 1/6066 381/74 |
| 2015/0048790 A1* | 2/2015 | Rudser .................... | H02J 7/025 320/108 |
| 2016/0049757 A1* | 2/2016 | Hou ....................... | H01R 24/66 439/620.15 |
| 2016/0360302 A1* | 12/2016 | Noll .................... | H04Q 11/0067 |
| 2017/0007849 A1* | 1/2017 | Hautvast .............. | A61N 5/1001 |
| 2017/0338665 A1* | 11/2017 | Long ..................... | H02J 7/0027 |

* cited by examiner

*Primary Examiner* — Walter J Divito
(74) *Attorney, Agent, or Firm* — Clements Bernard Walker PLLC; Christopher L. Bernard; Lawrence A. Baratta, Jr.

(57) ABSTRACT

A system that includes (i) a device having connectors connected to pluggable modules external to the device and (ii) the pluggable modules exchanging signals with the device via the connectors. In particular, the pluggable modules includes a first pluggable module and a second pluggable module that further exchange a supplemental signal with each other and bypassing the connectors.

20 Claims, 8 Drawing Sheets

FRONTPLANE COMMUNICATION NETWORK BETWEEN MULTIPLE PLUGGABLE MODULES ON A SINGLE FACEPLATE

BACKGROUND

A network (e.g., a telecommunication network) may have a data plane that includes devices exchanging network traffic, and a control plane that controls how network traffic is routed in the data plane. Operations support systems (OSSs) in the control plane are computer systems used by telecommunications service providers to manage telecommunication networks, such as telephone networks. OSSs and data plane devices (referred to as Network Elements (NEs)) exchange messages to perform management functions, such as network inventory, service provisioning, network configuration and fault management, etc. For example, the messages may be based on Transaction Language 1 (TL1), which is a widely used management protocol in telecommunications. In particular, operations domains (e.g., surveillance, memory administration, and access and testing) define and use TL1 messages to accomplish specific functions between the OSSs and the NEs.

A message (e.g., TL1 message) may include a command, which is a directive to a computer program, in a receiving device of the message, to perform a specific task. The command that specifies a task to be performed in a network may be referred to as a network command. The message that includes the network command may be referred to as a network command message. Typically, the receiving device executes (or otherwise processes) the command immediately after receiving the message and also reports the associated response immediately. When the command is sent to a large number of receiving devices, problems may arise due to the timing difference (referred to as a command skew) with respect to when the command is received by any two receiving devices. For example, when a command is sent to more than 10 NEs in a telecommunication network, the command skew produces unreliable results of the command.

IEEE 1588 standards describe a hierarchical master-slave architecture for clock distribution. Under this architecture, a clock distribution system consists of one or more communication media (network segments) and one or more clocks. An ordinary clock is a device with a single network connection and is either the source (master) of or destination (slave) for a synchronization reference. A boundary clock is a device with multiple network connections and can accurately synchronize one network segment to another. A synchronization master is a device selected for each of the network segments in the system. The root timing reference is called the grandmaster. The grandmaster is a device that transmits synchronization information to the clocks residing on its network segment. The boundary clocks with a presence on that segment then relay accurate time to the other segments to which they are also connected. IEEE 1588-2008 introduces a transparent clock associated with network equipment used to convey PTP (precision timing protocol) messages. The transparent clock modifies PTP messages as they pass through the device. In particular, timestamps in the PTP messages are modified to correct for communication latency, which is time spent traversing the network equipment. This scheme improves distribution accuracy by compensating for delivery variability across the network.

SUMMARY

In general, in one aspect, the invention relates to a system. The system includes (i) a device including connectors connected to pluggable modules external to the device and (ii) the pluggable modules exchanging signals with the device via the connectors, where the pluggable modules include a first pluggable module and a second pluggable module that further exchange a supplemental signal with each other and bypassing the connectors.

In general, in one aspect, the invention relates to a system. The system includes (i) a device including a backplane internal to the device, and connectors connected to pluggable modules external to the device, where the connectors hold the pluggable modules in a rigid relative position to the device with mechanical stability, and (ii) the pluggable modules exchanging signals with the device via the connectors and the backplane according to a pre-determined communication protocol. The system further includes (iii) a communication assembly peripheral to the device and in proximity of the connectors, where the communication assembly is configured to exchange a supplemental signal among the pluggable modules and bypassing the connectors and the backplane, and compensate a communication latency among the pluggable modules and the device by using the supplemental signal to enhance the pre-determined communication protocol.

In general, in one aspect, the invention relates to a method. The method includes connecting, using connectors of a device, the device to pluggable modules external to the device, where the device includes a backplane internal to the device. The method further includes holding, using the connectors, the pluggable modules in a rigid relative position to the device with mechanical stability, exchanging, based on a pre-determined communication protocol, signals among the pluggable modules and the device via the connectors and the backplane, further exchanging, via a communication assembly peripheral to the device and in proximity of the connectors, a supplemental signal among the plurality of pluggable modules and bypassing the connectors and the backplane, and reducing a communication latency among the pluggable modules by using the supplemental signal to enhance the pre-determined communication protocol.

Other aspects of the invention will be apparent from the following description and the appended claims.

DETAILED DESCRIPTION

Figure 1:
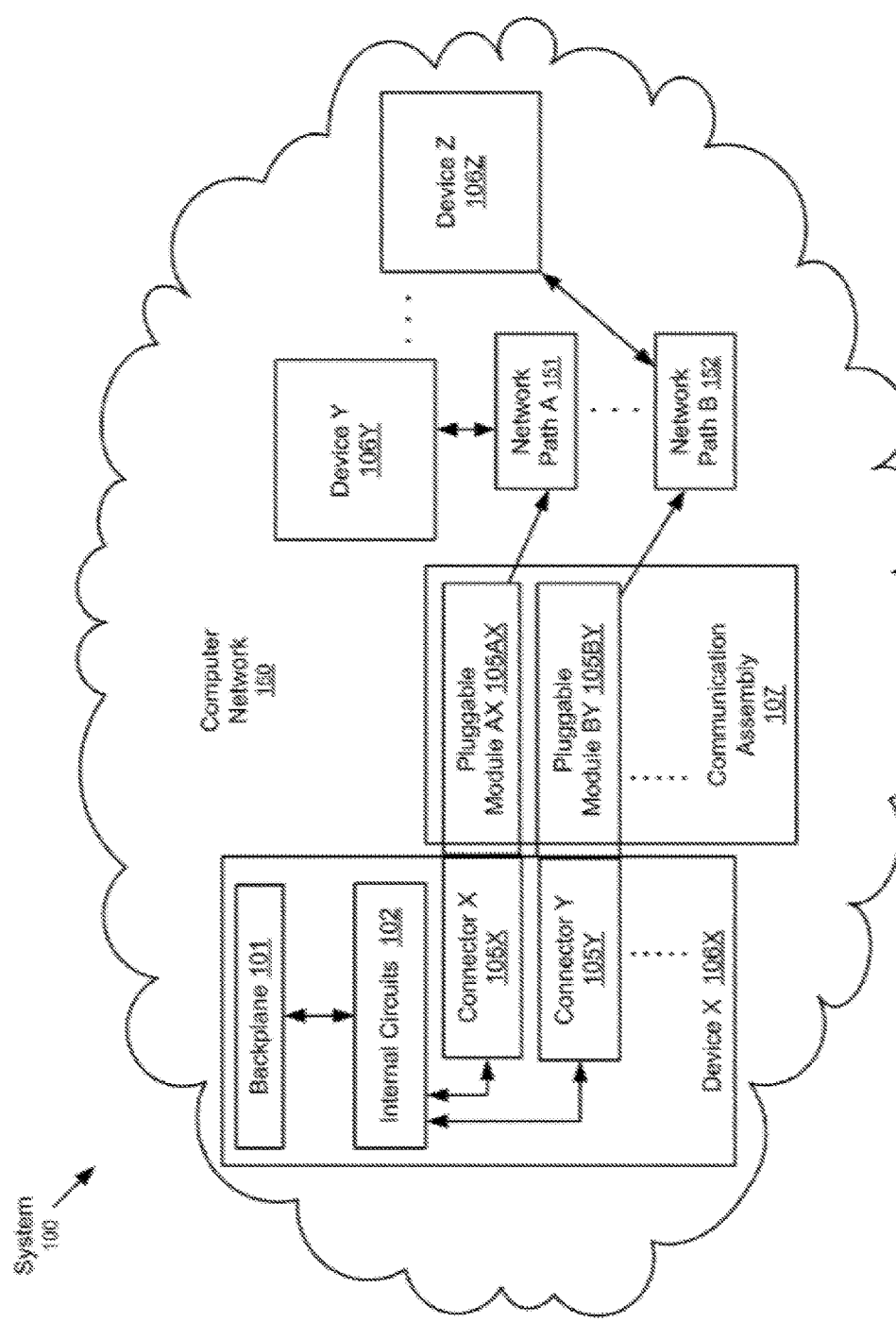
FIG. 1 shows a block diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and a method for providing an out-of-band channel for pluggable modules external to a device. In particular, the pluggable modules exchange signals with the device via connectors of the device. In addition, the pluggable modules further exchange a supplemental signal via the out-of-band channel and bypassing the connectors. In one or more embodiments of the invention, the device connects to network paths in a computer network where the pluggable modules provide an interface function between the device and the network paths. Accordingly, network messages traverse the network paths through the device according to a pre-determined communication protocol. A communication latency occurs when the network messages traverse through the device based on the signals exchanged between the device and the pluggable modules.

In one or more embodiments of the invention, the network messages traverse through the device via the connectors and a backplane internal to the device. In one or more embodiments of the invention, the connectors hold the pluggable modules in a rigid relative position to the device with mechanical stability. In addition, a communication assembly is peripheral to the device and in proximity of the connectors. Specifically, the communication assembly is configured to exchange the supplemental signal among the pluggable modules and bypassing the connectors and the backplane. Accordingly, the communication assembly compensates the aforementioned communication latency by using the supplemental signal to enhance the pre-determined communication protocol.

FIG. 1 shows a system (100) in accordance with one or more embodiments. As shown in FIG. 1, the system (100) includes multiple devices (e.g., device X (106X), device Y (106Y), device Z (106Z), etc.) connected by an computer network (150) in accordance with one or more embodiments. In particular, the multiple devices (e.g., device X (106X), device Y (106Y), device Z (106Z), etc.) are connected via network paths (e.g., network path A (151), network path B (152), etc.) of the computer network (150). In one or more embodiments, a device (e.g., device X (106X)) is connected to a network path (e.g., network path A (151), network path B (152)) via a pluggable module (e.g., pluggable module AX (105AX), pluggable module BY (105BY), etc.) that provides an interface function between the device and the network path. In addition, a communication assembly (e.g., communication assembly (107)) may be disposed in a peripheral position of or optionally attached to a single device (e.g., device X (106X)). In one or more embodiments, the communication assembly (107) allows communications bypassing the device X (106X) and among pluggable modules (e.g., pluggable module AX (105AX), pluggable module BY (105BY), etc.) connected to the device X (106X).

In one or more embodiments of the invention, the computer network (150) includes wired and/or wireless portions of a telecommunications network. In one or more embodiments, a telecommunications network includes a collection of devices, links, and any intermediate nodes connected to enable telecommunication between the devices of the telecommunications network. The device X (106X), device Y (106Y), and device Z (106Z) are nodes of the telecommunication network and may be computing devices or networking devices of any type, including servers, routers, switches, mobile phones, desktop or tablet personal computers (PCs), etc. Within the computer network (150), a network path (e.g., network path A (151), network path B (152)) between two devices is a sequence of links, intermediate nodes, and/or any intervening devices that connect the two devices. In one or more embodiments, a device may be connected to multiple network paths. For example, the device X (106X) is connected to the network path A (151) and the network path B (152) via the pluggable module AX (105AX) and the pluggable module BY (105BY), respectively. In one or more embodiments, multiple network paths may exist between two devices. Accordingly, messages or other telecommunication data are exchanged between the two devices via one or more of the network paths. The transmission delay of sending/receiving messages over any particular network path (e.g., network path A (151), network path B (152)) may depend on characteristics of the links, intermediate nodes, and/or any intervening devices contained in the particular network path.

In one or more embodiments of the invention, the device X (106X), device Y (106Y), and device Z (106Z) are configured to send and/or receive network messages over the computer network (150). The device X (106X), device Y (106Y), and device Z (106Z) may include controlling devices in the control plane of the telecommunication network and/or NEs in the data plane of the telecommunication network. In one or more embodiments, the network messages may be based on TL1 or other management protocols. In one or more embodiments, the network messages transmit across the network path A (151) and network path B (152) according to a communication protocol or a network protocol (e.g., Ethernet, Synchronous Optical Networking (SONET)/Synchronous Digital Hierarchy (SDH), G.709 Optical Transport Network (OTN), etc.) of the computer network (150).

In one or more embodiments of the invention, the device X (106X) includes a backplane (101), internal circuits (102), and connectors (e.g., connector X (105X), connector Y (105Y)). In one or more embodiments, the backplane (101), internal circuits (102), and connectors (e.g., connector X (105X), connector Y (105Y)) are substantially enclosed within a mechanical enclosure (not shown) of the device X (106X). These components of the device X (106X) are described below. In one or more embodiments, the backplane (101) may be omitted.

A connector is an electro-mechanical device for joining electrical circuits using a mechanical assembly. As user herein, the term "electro-mechanical" refers to a combination of "electrical" and 'mechanical." Further, the term "electrical" may refer to optoelectronics and/or electro-optics properties. In one or more embodiments, an electrical circuit may optionally include an optoelectronics circuit and/or electro-optics circuit. Two electrical circuits may be connected via an electrical connection and a mechanical connection provided by the electro-mechanical device. In one or more embodiments, the connector X (105X) and connector Y (105Y) provide temporary connections between the internal circuits (102) and the pluggable modules (e.g., pluggable module AX (105AX), pluggable module BY (105BY)) external to the mechanical enclosure of the device X (106X)). In particular, each external pluggable module is connected to the device X (106X), more specifically the internal circuits (102), when the electrical connection and the mechanical connection are made using a corresponding connector (e.g., connector X (105X), connector Y (105Y)). From time to time, each external pluggable module may be disconnected from the device X (106X) or the internal circuits (102) by separating (e.g., pulling apart) from the corresponding connector (e.g., connector X (105X), connector Y (105Y)). Specifically, separating from the corresponding connector disengages the electrical connection and the mechanical connection. In one or more embodiments, the mechanical assembly of the connector X (105X) is adapted to hold, when connected, the pluggable module AX (105AX) in a rigid relative position to the device X (106X) with mechanical stability. As used here in, the term "mechanical stability" refers to a pre-determined mechanical tolerance of location, orientation, alignment, or other mechanical property of the pluggable module AX (105AX) relative to the device X (106X). Further, the term "rigid" refers to a limited range of movement of the pluggable module AX (105AX) relative to the device X (106X) over time. In one or more embodiments, the pre-determine mechanical tolerance and the limited range of movement maintains an acceptable distance and alignment between two or more signal interfaces (described below) disposed on the pluggable module AX (105AX) and the device X (106X) for proximity based signal exchange. For example, the rigid relative position may be maintained by an interlocking mechanism between each pluggable module and the corresponding connector. The interlocking mechanism may include a locking pin or tab that interlocks a male portion and a female portion of the mechanical connection. Similarly, the mechanical assembly of the connector Y (105Y) is adapted to hold, when connected, the pluggable module BY (105BY) in another rigid relative position to the device X (106X) with mechanical stability. Accordingly, the pluggable module AX (105AX) and the pluggable module BY (105BY), when connected to the connectors of the device X (106X), are held in a rigid relative position to each other. In one or more embodiments, the rigid relative position between all pluggable modules (e.g., pluggable module AX (105AX), pluggable module BY (105BY), etc.) connected to the device X (106X) causes all such connected pluggable modules to be within a pre-determined 3-dimensional (3D) range (e.g., 5 centimeters by 10 centimeters by 60 centimeters, 60 centimeter on each of X-axis, Y-axis, and Z-axis, etc.). In particular, the pre-determined 3D range is dependent on a layout of the connectors on the mechanical enclosure of the device X (106X). In contrast, one or more of the pluggable modules, when being disconnected from the connectors of the device X (106X), may exit from the pre-determined 3D range.

In one or more embodiments, each pluggable module (e.g., pluggable module AX (105AX), pluggable module BY (105BY), etc.) is an electro-mechanical device for providing an interface function between the internal circuits (102) and the network paths (e.g., network path A (151), network path B (152)). In one or more embodiments, the interface functions of the pluggable module AX (105AX) and the pluggable module BY (105BY) allow network communication data packets (e.g., forming a network message) to be routed between the network path A (151) and the network path B (152) through the device X (106X). Specifically, the pluggable module AX (105AX) and the pluggable module BY (105BY) exchange one or more signals with the device X (106X) via the connector X (105X) and connector Y (105Y) to route the network communication data packets. For example, the one or more signals may traverse the connector X (105X), the internal circuits (102), the backplane (101), and the connector Y (105Y) to route the network communication data packets. An example of routing the network communication data packets via the device X (106X) is described in reference to FIG. 3 below.

Returning to the discussion of the device X (106X), in one or more embodiments, the internal circuits (102) include hardware circuitries and embedded software components for implementing one or more functionalities of the device X (106X). The backplane (101) is used as a backbone to connect several portions (e.g., printed circuit boards, flex circuit, etc.) of the internal circuits (102) together to make up a complete system. In one or more embodiments, the backplane (101) includes a group of electrical connectors in parallel with each other, so that each pin of each connector is linked to the same relative pin of all the other connectors forming a computer bus. The electrical connectors on the backplane (101) are internal connectors that are separate and distinct from the aforementioned connectors for connecting the pluggable modules. In one or more embodiments, the internal circuits (102) are self-contained without any backplane for connection. In other words, the backplane (101) may be an integral part of the internal circuits (102) or may be omitted entirely. Additional details of the device X (106X) are described in reference to FIG. 2 below.

In one or more embodiments, the communication assembly (107) is peripheral to the device X (106X) and in proximity of the connectors of the device X (106X). In particular, the communication assembly (107) is external to the mechanical enclosure of the device X (106X). For example, the communication assembly (107) may be disposed in an intervening position between the pluggable modules connected to the device X (106X) and the mechanical enclosure of the device X (106X). In one or more embodiments, the communications assembly (107) may not exist as a physical entity. For example, the communications assembly (107) may correspond to a free space allowing wireless communication therethrough. An example of the communication assembly (107) disposed in such intervening position is described in reference to FIGS. 4 and 5 below.

As note above, the communication assembly (107) allows communications among the pluggable modules (e.g., pluggable module AX (105AX), pluggable module BY (105BY), etc.) connected to the device X (106X). In one or more embodiments, the communication assembly (107) is configured to exchange a supplemental signal (not shown) among the pluggable modules (e.g., pluggable module AX (105AX), pluggable module BY (105BY), etc.) and bypassing the device X (106X). In particular, the supplemental signal is exchanged among the pluggable modules (e.g., pluggable module AX (105AX), pluggable module BY (105BY), etc.) without traversing the connectors (e.g., connector X (105X), connector Y (105Y)), the internal circuits (102), and the backplane (101) of the device X (106X). In one or more embodiments, the supplemental signal exchanged among the pluggable modules (e.g., pluggable module AX (105AX), pluggable module BY (105BY), etc.) is used to compensate a communication latency among the pluggable modules (e.g., pluggable module AX (105AX), pluggable module BY (105BY), etc.). In particular, the communication latency is compensated by using the supplemental signal to enhance a communication protocol used to route the network communication data packets via the device X (106X). Throughout this disclosure, the term "supplemental signal" refers to the signal exchanged among the pluggable modules without traversing the connectors or other portion of the device that the pluggable modules are connected to.

Although FIG. 1 only shows three devices (i.e., device X (106X), device Y (106Y), device Z (106Z)) and two network paths (i.e., network path A (151), network path B (152)), those skilled in the art, having the benefit of this detailed description, will appreciate that the system (100) may have any number of devices and network paths. Further, although FIG. 1 only shows one communication assembly (107) and two pluggable modules (i.e., pluggable module AX (105AX), pluggable module BY (105BY)), those skilled in the art, having the benefit of this detailed description, will appreciate that the system (100) may have any number of communication assemblies and pluggable modules. In one or more embodiments of the invention, the operations of the system (100) are performed using the method described in reference to FIG. 7 below.

Figure 2:
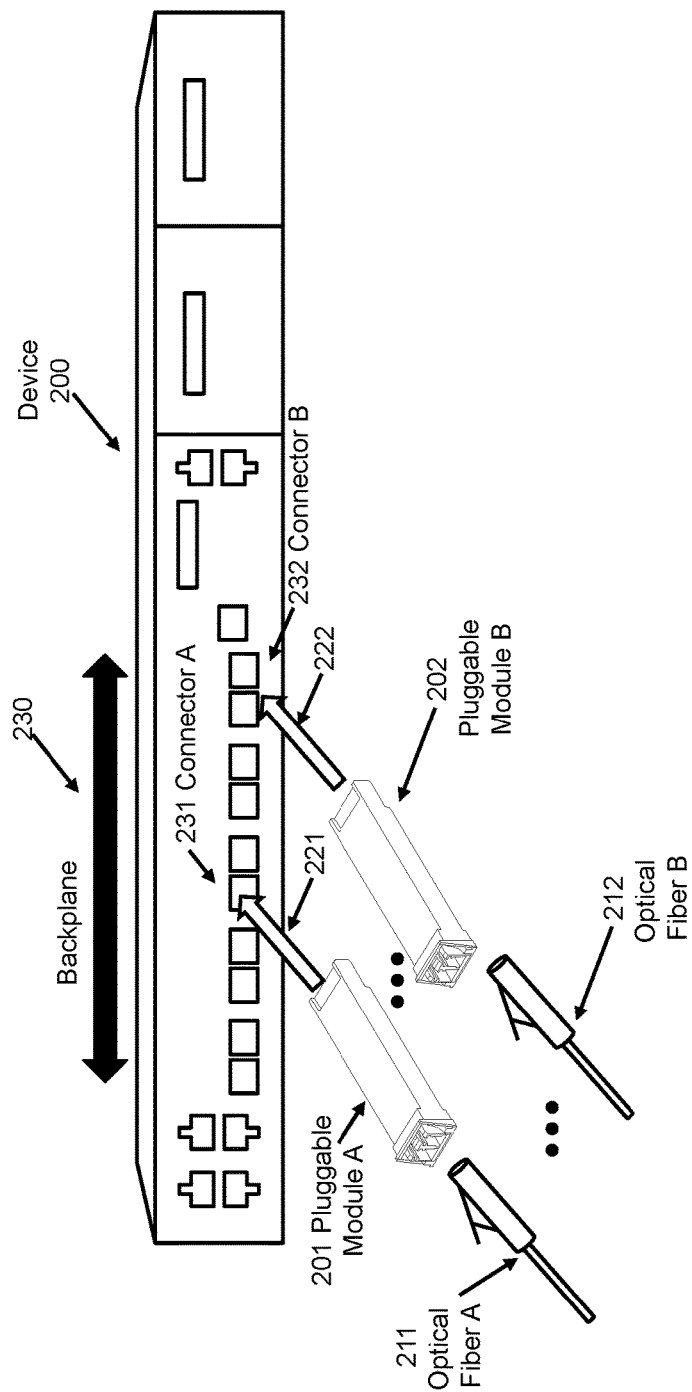
FIG. 2 depicts prior art pluggable modules plugging into a device.

FIG. 2 depicts a prior art pluggable modules plugging into a device. As shown in FIG. 2, the device (200) having multiple connectors (e.g., connector A (231), connector B (232), etc.) and the backplane (230) is an example of the device X (106X) having multiple connectors (e.g., connector X (105X), the connector Y (105Y), etc.) and the backplane (101) depicted in FIG. 1 above. In addition, the optical fiber A (211) and the optical fiber B (212) are example elements included in the network path A (151) and the network path B (152) depicted in FIG. 1 above. Further, the pluggable module A (201) and the pluggable module B (202) are examples of the pluggable module AX (105AX) and the pluggable module BY (105BY) that provide an interface function between the device (200) and the optical fibers (i.e., optical fiber A (211), optical fiber B (212)). In particular, the arrows (221) and (222) represent connecting the pluggable module A (201) and the pluggable module B (202) to the connector A (231) and the connector B (232), respectively. Although not explicitly shown, the optical fiber A (211) and the optical fiber B (212) may be connected to the pluggable module A (201) and the pluggable module B (202). As noted above, the connections from the pluggable module A (201) and the pluggable module B (202) to the connector A (231) and the connector B (232) may include electrical-only, optical-only, optoelectrical, and/or electro-optical connections. Similarly, the connections from the optical fiber A (211) and the optical fiber B (212) to the pluggable module A (201) and the pluggable module B (202) may also include electrical-only, optical-only, optoelectrical, and/or electro-optical connections.

As noted above, the network messages may traverse the network paths (e.g., optical fiber A (211), optical fiber B (212)) through the device (200) according to a pre-determined communication protocol. The pre-determined communication protocol may include or otherwise based on the IEEE 1588 standards, the precision timing protocol, Ethernet, Synchronous Optical Networking (SONET)/Synchronous Digital Hierarchy (SDH), G.709 Optical Transport Network (OTN), etc. In particular, the IEEE 1588 standards provide timing synchronization for devices in a network by aligning "slave clocks" for sync-capable devices. This is achieved by first deploying a grandmaster clock that all slave clocks in the network align to. In the IEEE 1588 context, the terms "grandmaster clock" and "slave clocks" may refer to the actual clock signals or the devices using the clock signals interchangeably. In this context, the grandmaster clock exchanges a series of messages (e.g., Sync, Follow-up, Delay Request and Delay Response) between each slave clock. This messages allows the slave clocks to calculate the delay in a network and compensate for the delay when the slave clock is being aligned. In other words, when the grandmaster clock announces the exact time at any given moment to a slave clock, the slave clock computes the time period for the announcement to reach itself in order to accurately align its clock with the grandmaster clock.

In one scenario of implementing the IEEE 1588 standards, the device (200) includes special features such as accurate time stamp capabilities, special software to recover and analyze IEEE 1588 packets, an oven-controlled oscillator and specialized hardware that implements a phase locked loop. Specifically, the device (200) uses these special features to correct, regenerate, or otherwise modify an IEEE 1588 data stream and forward a newly constructed data stream that corrects for the asymmetric delay on the backplane (230) of the device (200).

In another scenario of implementing the IEEE 1588 standards, the device (200) provides frequency and phase references to the pluggable module A (201) and the pluggable module B (202). These references are used to drive timestamp circuits inside the pluggable module A (201) and the pluggable module B (202) to remove or otherwise compensate the communication latency due to noisy residence time within the device (200).

In either scenario of implementing the IEEE 1588 standards described above, communication between two pluggable modules (e.g., the pluggable module A (201) and pluggable module B (202)) is routed through the device (200) with an asymmetric timing delay particular to the corresponding connector pair. Packet delay variation between the asymmetric timing delays of different connector pairs negatively impacts accuracy of the timestamper circuits in the corresponding pluggable modules. Accordingly, delay-critical communication between two pluggable modules (e.g., pluggable module A (201), pluggable module B (202)) is not possible. As a result, when a network is scaled up and/or software defined networks are deployed, the packet delay variation from the asymmetric timing delays may render a clock distribution system unusable.

Figure 3:
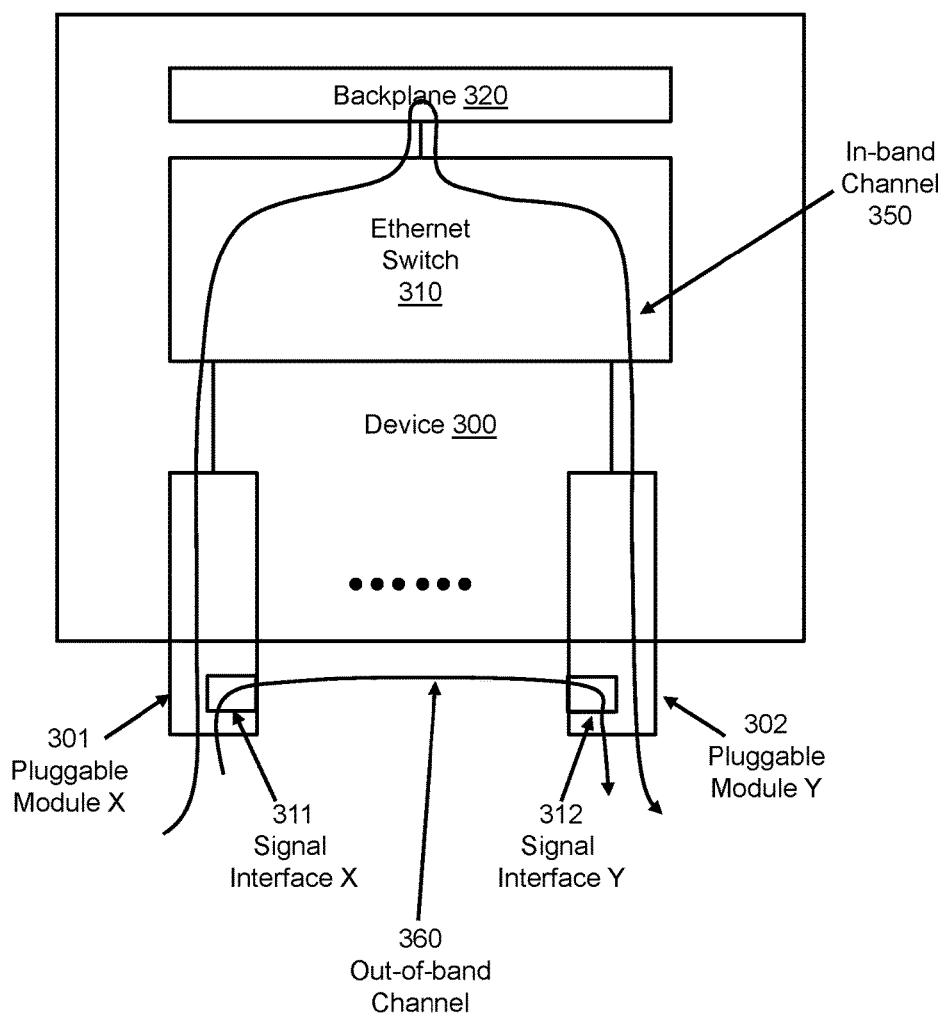
FIG. 3 shows a schematic diagram of communication channels of pluggable modules plugged into a device in accordance with one or more embodiments of the invention.

FIG. 3 shows a schematic diagram of communication channels of pluggable modules plugged into a device in accordance with one or more embodiments of the invention.

In telecommunications and computer networking, a communication channel or channel refers to either a physical transmission medium such as a wire, or to a logical connection over a multiplexed medium such as a radio channel. A channel is used to convey an information signal, for example a digital bit stream, from one or more senders (or transmitters) to one or more receivers. A channel has a certain capacity for transmitting information, often measured by its bandwidth in Hz or its data rate in bits per second.

As shown in FIG. 3, the device (300) having multiple connected pluggable modules (e.g., pluggable module X (301), pluggable module Y (302), etc.) and the backplane (320) is an example of the device X (106X) having multiple connected pluggable modules (e.g., pluggable module AX (105AX), pluggable module BY (105BY), etc.) and the backplane (101) depicted in FIG. 1 above. In addition, the Ethernet switch (310) is an example of the internal circuits (102) of the device X (106X) depicted in FIG. 1 above.

Further as shown in FIG. 3, the in-band channel (350) represents the physical transmission medium that allow network messages to travel through the device (300) according to the aforementioned communication protocol(s). The timing delay incurred by a network message or by a signal to travel through the device (300) from the pluggable device X (301) to the pluggable device Y (302) via the Ethernet switch (310), the backplane (320) and any intervening signal path is referred to as a communication latency of the two pluggable modules. The communication latency for different pairs of pluggable modules of the device (300) may vary. The variation in the communication latency for different pairs of pluggable modules is referred to as a time delay variation of the device (300). In one or more embodiments of the invention, the device (300) and/or the pluggable module X (301) and pluggable module Y (302) may not include all the aforementioned special features for implementing the IEEE 1588 standards. In such embodiments, the pluggable module X (301) and pluggable module Y (302) include the signal interface X (311) and signal interface Y (312), respectively, to implement an out-of-band channel (360). In one or more embodiments, the out-of-band channel (360) is used to exchange a supplemental signal among the connected pluggable modules of the device (300). Specifically, the out-of-band channel (360) and the supplemental signal supplements the aforementioned communication protocol(s) to meet the timing requirement of the clock distribution system. For example, the supplemental signal may provide a synchronization timing that allows the communication latency and/or time delay variation to be compensated.

In an example scenario, an IEEE 1588 grandmaster sends a timing packet stream to the device (300), which is an old legacy node not fully compliant with the IEEE 1588 or SyncE (Synchronous Ethernet) standards. The pluggable module X (301) and pluggable module Y (302) exchange the supplemental signal via the out-of-band channel (360) to establish a common frequency and phase, referred to as a common time base or a single time base. This single time base may be a low bandwidth (e.g., 64 baud) signal and is independent of or unrelated to the grandmaster's frequency and phase. The timing packet stream from the grandmaster is then processed as below.

The pluggable module X (301) receives the grandmasters timing packet stream and performs ingress timestamping before passing the timing packet stream to the pluggable module Y (302) through the in-band channel (350). Accordingly, the pluggable module Y (302) receives the timing packet stream and performs egress timestamping. The ingress timestamp represents or otherwise corresponds to a time point when the timing packet stream is received by the pluggable module X (301). The egress timestamp represents or otherwise corresponds to a time point when the timing packet stream is received by the pluggable module Y (302). The ingress and egress timestamps are both referenced to the single time base enabled by the out-of-band channel (360). The ingress and egress timestamps are subtracted or otherwise compared to generate a difference (referred to as the residence time) that is used to update the correction field in the timing packet stream. The timestamps may be subtracted or otherwise compared because they are both referenced to the single time base enabled by the out-of-band channel (360). Without the out-of-band channel (360), the pluggable module X (301) and pluggable module Y (302) would establish another common time base through the in-band channel (350) where a noise level of the Ethernet switch (310) may degrade timing accuracy. By using the out-of-band channel (360), network timing may be moved off the in-band channel (350) to eliminate asymmetric delays and packet delay variations and increase performance and scalability.

In one or more embodiments, the out-of-band channel (360) is used as a management channel for diagnostic purposes to bypass the network device (350) that may become inoperable. For example, in the computer network (150) depicted in FIG. 1, the device Y (106Y) and device Z (106Z) may use the out-of-band channel (if available) via the pluggable module AX (105AX) and pluggable module BY (105BY) to communicate for diagnostic purposes in the event that the device X (106X) may become inoperable. In another example, the pluggable module AX (105AX) and/or corresponding port of the device X (106X) may be disabled via the out-of-band channel (if available) in the event that the device X (106X) may become inaccessible due to a denial-of-service (DoS) attack.

In one or more embodiments, the in-band channel (350) supports communication between devices that are kilometers apart in the computer network (150). Although a single out-of-band channel supports communication between pluggable modules within a much shorter range (e.g., 60 centimeters), multiple out-of-band channels may be coupled via the network paths to form a larger out-of-band channel that spans a large part of the network or the entire network.

Figure 4:
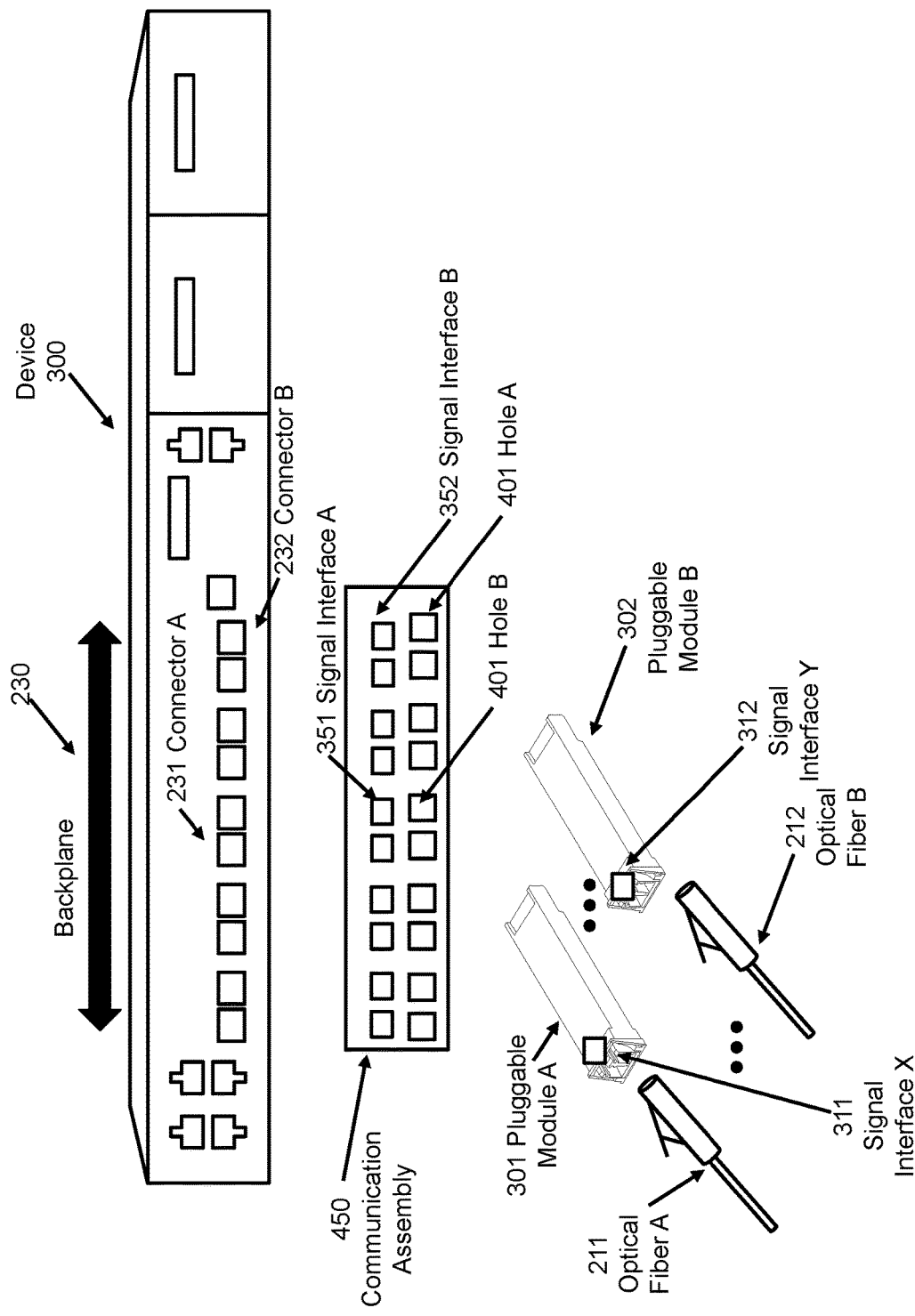
FIG. 4 depicts pluggable modules and a communication assembly that are associated with a device in accordance with one or more embodiments of the invention.

FIG. 4 depicts pluggable modules and a communication assembly that are associated with a device in accordance with one or more embodiments of the invention. Specifically, FIG. 4 shows a 3D exterior view of the device (300) depicted in FIG. 3 above.

In one or more embodiments of the invention, the device (300) may be similar to the device (200) depicted in FIG. 2 above and uses similar types of connectors (e.g., connector A (231), connector B (232), etc.) and similar types of optical fibers (e.g., optical fiber A (211), optical fiber B (212), etc.). In addition, the backplane (320) of the device (300) may be similar to the backplane (230) of the device (200) depicted in FIG. 2 above. In one or more embodiments, the device (300) may not include all the aforementioned special features for implementing the IEEE 1588 standards as the device (200). Instead, the pluggable module X (301) and pluggable module Y (302) include the signal interface X (311) and signal interface Y (312) to implement the out-of-band channel (360) depicted in FIG. 3 above. In one or more embodiments, other than having the additional signal interface X (311) and signal interface Y (312), the pluggable module X (301) and pluggable module Y (302) are similar to the pluggable module A (201) and pluggable module B (202) depicted in FIG. 2 above. In one or more embodiments, in contrast to the pluggable module A (201) and pluggable module B (202) depicted in FIG. 2 above, the timestamper circuits are omitted from the pluggable module X (301) and pluggable module Y (302).

In one or more embodiments, the signal interface X (311) and signal interface Y (312) include free-space short-range optical communication circuitries, with and without the help of a wave-guide, to implement the out-of-band channel (360) depicted in FIG. 3 above. In particular, the free-space short-range optical communication circuitries are configured to establish data communication within the pre-determined 3D range (described in reference to FIG. 1 above) that is defined by a layout of the connectors (e.g., connector A (231), connector B (232), etc.) on the mechanical enclosure of the device (300). Accordingly, the aforementioned supplemental signal may be exchanged among the pluggable modules using the free-space short-range optical communication circuitries.

In one or more embodiments, the signal interface X (311) and signal interface Y (312) include free-space short-range wireless communication (e.g., based on NFC, Bluetooth, Wi-fi, etc.) circuitries to implement the out-of-band channel (360) depicted in FIG. 3 above. In particular, the free-space short-range wireless communication circuitries are configured to establish data communication within the pre-determined 3D range (described in reference to FIG. 1 above) that is defined by a layout of the connectors (e.g., connector A (231), connector B (232), etc.) on the mechanical enclosure of the device (300). Accordingly, the aforementioned supplemental signal may be exchanged among the pluggable modules using the free-space short-range wireless communication circuitries.

In one or more embodiments, the signal interface X (311) and signal interface Y (312) are coupled using a stranded single-conductor cable to implement the out-of-band channel (360) depicted in FIG. 3 above. The existing ground path of the pluggable module X (301) and pluggable module Y (302) is used as signal return. An encoding scheme that specifically supports the desired application (e.g., delay accuracy for timing applications) is used to transmit/receive data over the out-of-band channel. The stranded single-conductor cable may be clear-taped to an existing faceplate of the device (300) without obscuring printed details on the faceplate. Specifically, the faceplate is one side of the mechanical enclosure where the connectors are located.

In one or more embodiments, the out-of-band channel (360) depicted in FIG. 3 above is implemented using the communication assembly (450). In one or more embodiments, the communication assembly (450) is adhered to the device (300) and being adjacent to or overlapping the connector A (231) and connector B (232). For example, the communication assembly (450) may be adhered to the device (300) using velcro, glue, sticky tape, magnet, press-fit, snap-on, or other permanent or semi-permanent mechanism. In one or more embodiments, the communication assembly (450) may be positioned adjacent to the device (300) within the pre-determined 3D range (described in reference to FIG. 1 above) that is defined by a layout of the connectors (e.g., connector A (231), connector B (232), etc.) on the mechanical enclosure of the device (300). In such embodiments, the communication assembly (450) may not be adhered to the device (300) using any permanent or semi-permanent mechanism. As shown in FIG. 4, the connectors (e.g., connector A (231), connector B (232), etc.) are disposed in a frontal face (referred to as a faceplate) of the device (300). In this context and in contrast to the backplane (320), the communication assembly (450) may be referred to as a frontplane and the out-of-band channel (360) may be referred to as a frontplane communication network.

With the communication assembly (450) adhered to or adjacent to the device (300), in one or more embodiments, a signal interface A (351) of the communication assembly (450) is disposed in proximity to the connector A (231) and a signal interface B (352) of the communication assembly (450) is disposed in proximity to the connector B (232). In one or more embodiments, the pluggable module X (301) and pluggable module Y (302) may be connected to the connector A (231) and connector B (232) by penetrating through openings (i.e., hole A (400), hole B (401)) on the communication assembly (450). The resultant rigid relative positions of the pluggable modules to the device (300) maintain the signal interface A (351) and signal interface B (352) to be in proximity to or in physical connect with the signal interface X (311) and signal interface Y (312), respectively. Additional details of maintaining such proximity or physical contact are described in reference to FIG. 5 below. Accordingly, the aforementioned supplemental signal may be exchanged between the signal interfaces on the communication assembly (450) with the signal interfaces on the pluggable modules via proximity-based connections (e.g., optical-coupling, inductive-coupling, capacitive-coupling, or other wireless connections) or via physical contacts.

In one or more embodiments, multiple copies of the supplemental signal may be exchanged using multiple connections based on the proximity-based connections or the physical contacts. These multiple copies of the supplemental signal are redundant to each other in a failover operation. In other words, one copy of the supplemental signal may be automatically switched over to a redundant copy of the supplemental signal upon detecting that the copy of the supplemental signal in use has encountered a failure condition. For example, if the copy of the supplemental signal currently in use is temporarily jammed, the redundant copy of the supplemental signal may be used. In one or more embodiments, the multiple copies of the supplemental signal use orthogonal schemes and/or transmission media that are not susceptible to the same interference.

In one or more embodiments, the communication assembly (450) includes a routing element configured to route the supplemental signal between the signal interface A (351) and the signal interface B (352). Accordingly, the aforementioned supplemental signal may be exchanged among the pluggable modules via the signal interfaces and routing element on the communication assembly (450) and the signal interfaces on the pluggable modules. In one or more embodiments, the communication assembly (450) includes a printed circuit board (PCB) and an optional cover for cosmetic or protective purpose. In such embodiments, the routing element may include copper traces on the PCB. In one or more embodiments, the communication assembly (450) is substantially transparent with the appropriate choice of dielectric materials (e.g., polycarbonate). In such embodiments, the routing element may include light pipes or light guides made of the dielectric materials for transmitting a guided optical signal. Examples of the routing element are described in reference to FIG. 5 below.

In one or more embodiments, at least one of the signal interface A (351) and signal interface B (352) includes an active circuit that receives wireless power transmission from the corresponding pluggable module. For example, the active circuit may receive power from a light emitting diode (LED), a radio power transmission device, or an inductive power transmission device of the corresponding pluggable module. In other words, the power transmission may use LED/photo cell pairs or a tuned resonant circuit with an inductive coupling mechanism. In one or more embodiments, the aforementioned supplemental signal may provide both power transmission and data transmission.

Figure 5:
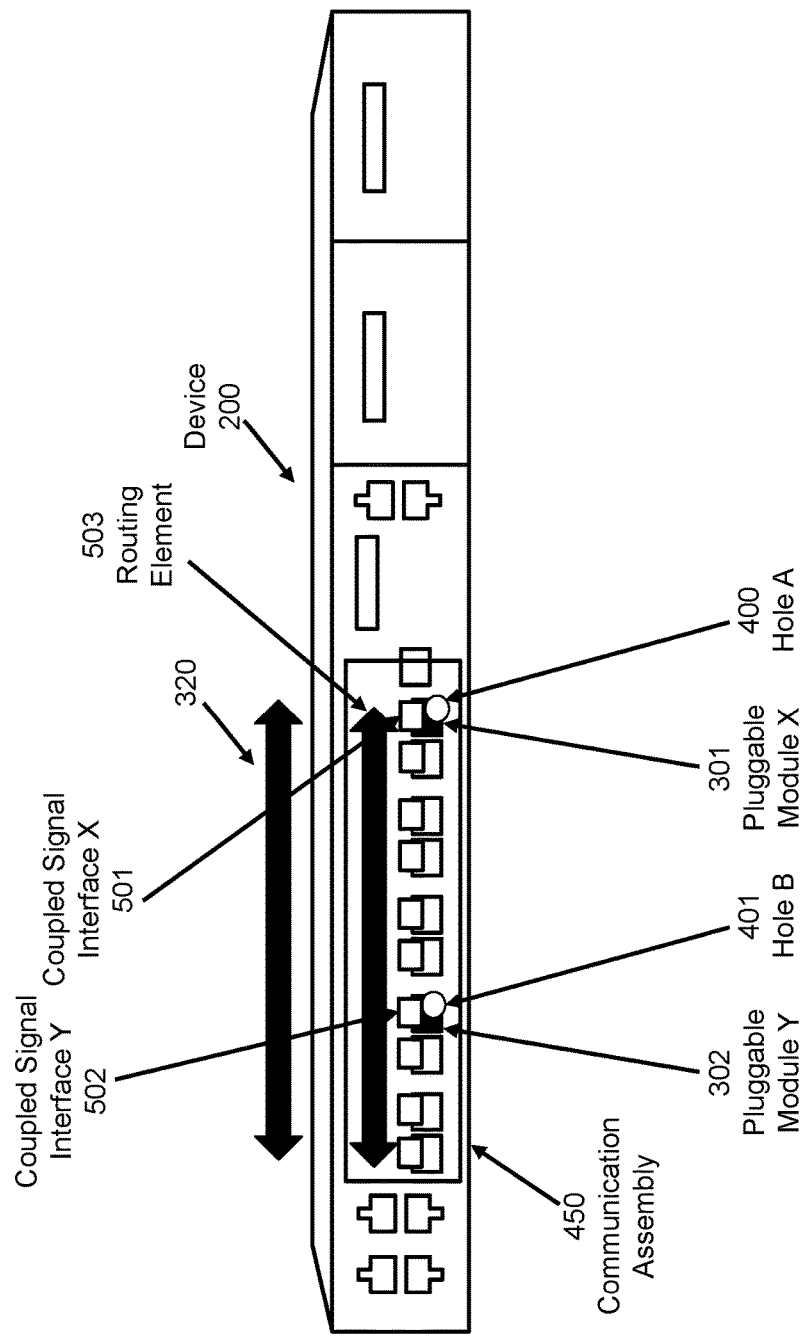
FIG. 5 depicts pluggable modules that are plugged into a device and coupled to a communication assembly in accordance with one or more embodiments of the invention.

FIG. 5 depicts pluggable modules that are plugged into a device and coupled to a communication assembly in accordance with one or more embodiments of the invention. Specifically, FIG. 5 shows the same elements depicted in FIG. 4 except that the communication assembly (450) is explicitly shown as adhered to the device (300). In addition, the pluggable module X (301) and pluggable module Y (302) are plugged into the connector A (231) and connector B (232) by penetrating the hole A (400) and hole B (401), respectively. The routing element described in reference to FIG. 4 is shown as the routing element (503) FIG. 5. The coupled signal interface X (501) represents the signal interface X (311) and signal interface A (351) in proximity or in physical contact to each other. The coupled signal interface Y (502) represents the signal interface Y (312) and signal interface B (352) in proximity or in physical contact to each other. The signal interface X (311), signal interface A (351), signal interface Y (312), and signal interface B (352) themselves as well as the connector A (231), connector B (232), optical fiber A (211), and optical fiber B (212) are not explicitly shown in FIG. 5 for clarity.

In one or more embodiments, the communication assembly (450) is based on one or more of the following:

(a) A special single-conductor copper wire that connects two pluggable modules and uses the ground of the device (300) as a return path. The single-conductor copper wire may be attached to a faceplate of the device (300).

(b) A special optical wire that connects the pluggable modules and attached to the faceplate of the device (300).

(c) Wireless (e.g., NFC, Bluetooth, Wifi) communication.

(d) A bus connection.

(e) Capacitive coupling using only the ground connection of each pluggable module to the device (300). The capacitive coupling may operate in a similar manner as gesture detection devices.

In one or more embodiments, the communication assembly (450) includes sensors to communicate with appropriately-equipped pluggable modules. These sensors may be photo diodes for optical communication or coils for near field communication (NFC). This communication may be one way or two way. For example, one way communication may be used for timing transfer while two way communication may allow reporting of the number and quantity of synchronized pluggable modules, the synchronization state, etc.

In one or more embodiments, the communication assembly (450) includes a receiver (or a transceiver for two-way communication). The receiver may be used to detect the aforementioned supplemental signal distributed from a selected pluggable module acting as a central distribution transmitter. Multiple communication assemblies associated with multiple devices may be in proximity to each other, such as mounted on an equipment rack. In such configuration, multiple central distribution transmitters of these communication assemblies may employ a specific orthogonal spreading code, such as a Gold code, in a spread spectrum signal to minimize interference. The spread spectrum signal may be made robust to hacking attacks by employing a stream cipher to encrypt the timing information, which may be recovered by correlation techniques.

In one or more embodiments, the communication assembly (450) is completely passive and provides a network interconnect for the pluggable modules to communicate. The coupled signal interface may be based on coils constructed within PCB layers of the communication assembly (450). No security mechanisms may be employed as communication occurs only in the near field. Timing distribution/synchronization among the pluggable modules may be performed using the supplemental signal with the proper frequency (e.g., 1 Hz) and phase. The supplemental signal may have a sine wave format or square wave with controlled edge rates to mitigate electromagnetic interference.

In one or more embodiments, the communication assembly (450) is entirely made from a clear polycarbonate material that acts as a light guide or light pipe for transmitting a guided optical signal. The light guide may have a symmetrical N:N splitter functionality that allows any-to-any optical communication between pluggable modules. The light guide may also interface with existing LED's on the pluggable modules and/or the faceplate of the device (300) to collect system/port status indicated by these LED's. In turn, the light guide allows the collected system/port status to be shared by the device (300) and the pluggable modules.

Figure 6:
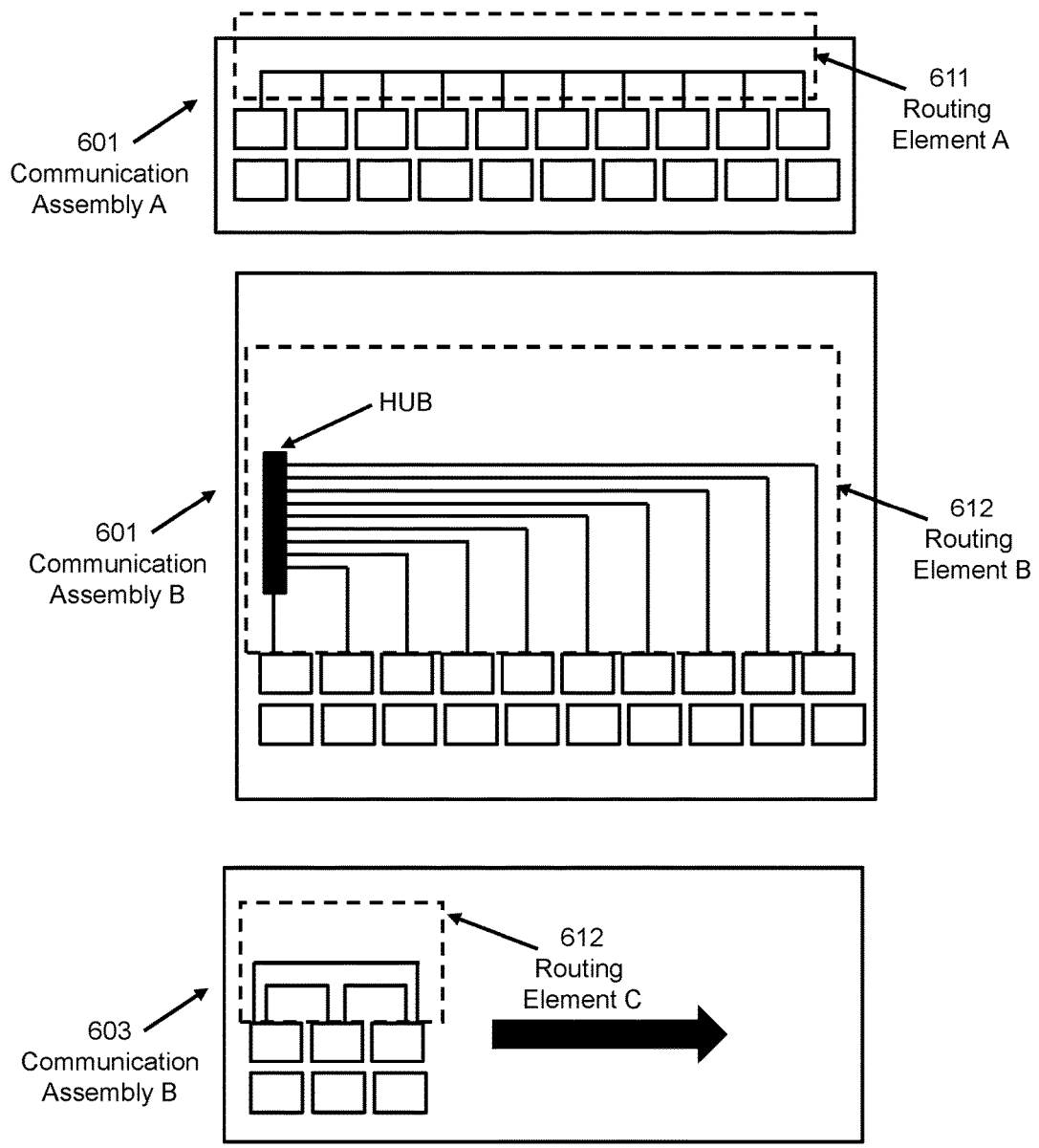
FIG. 6 shows schematic diagrams of examples of the communication assembly in accordance with one or more embodiments of the invention.

FIG. 6 shows schematic diagrams of examples of the communication assembly in accordance with one or more embodiments of the invention. As shown in FIG. 6, the communication assembly A (601) includes a bus connection based routing element A (611). The communication assembly B (602) includes a switched connection based routing element B (612) where a hub provides 1-to-N switching function. The communication assembly C (603) includes a point-to-point (i.e., N-to-N) connection based routing element C (613). As noted above, the routing element A (611), routing element B (612), and routing element C (613) may be based on copper trace based electrical connection and/or light guide based optical connection.

Figure 7:
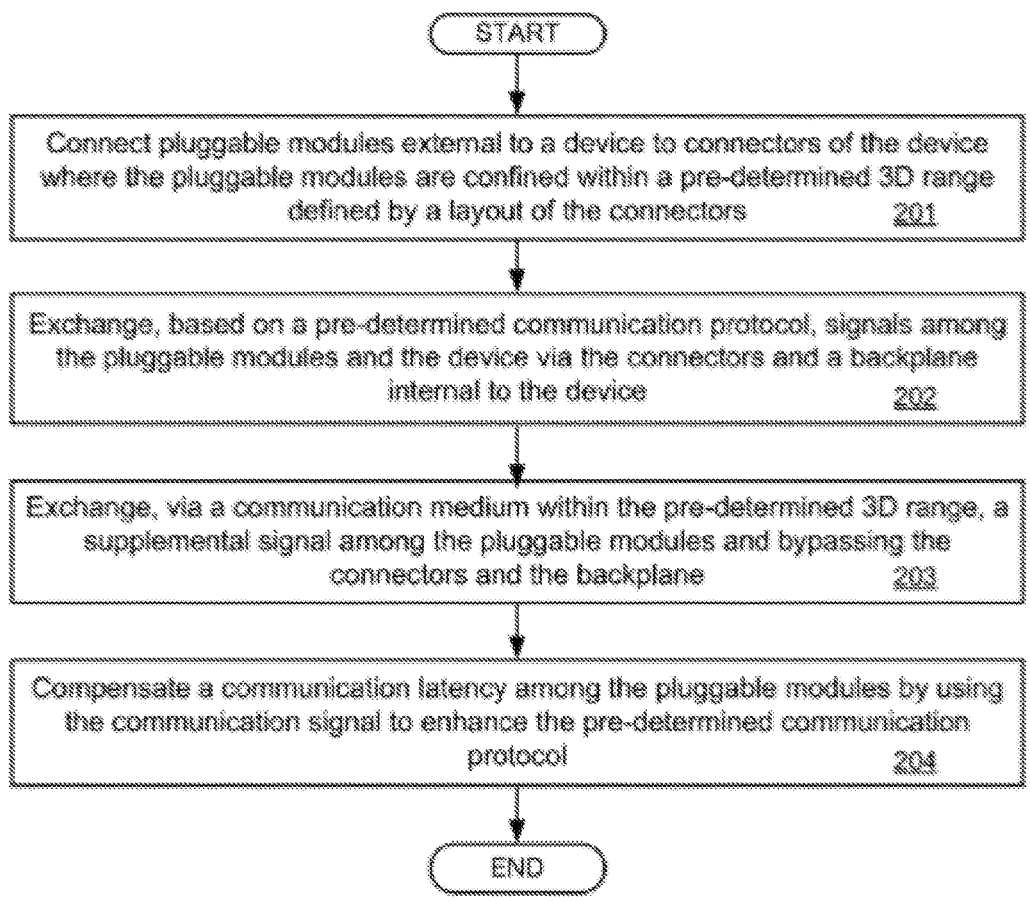
FIG. 7 shows a flowchart of a method in accordance with one or more embodiments of the invention.

FIG. 7 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100).

Initially in Step 201, pluggable modules external to a device are connected to connectors of the device. Accordingly, the pluggable modules are confined within a pre-determined 3D range defined at least by the layout of the connectors on a mechanical enclosure of the device. In particular, the pre-determined 3D range is substantially external to the device. In one or more embodiments of the invention, the pluggable modules are held by the connectors in a rigid relative position to the device with mechanical stability.

In Step 202, signals are exchanged among the pluggable modules and the device via the connectors and a backplane internal to the device. In particular, the backplane and internal circuits of the device form an in-band channel of the device. In one or more embodiments of the invention, the device is a node in a computer network and the signals are network supplemental signals based on a pre-determined communication protocol, such as a network communication protocol.

In Step 203, a supplemental signal is exchanged among the pluggable modules via a communication medium within the pre-determined 3D range. Accordingly, the pluggable modules communicate with each other bypassing the connectors and the backplane. In one or more embodiments of the invention, the communication medium includes a communication assembly peripheral to the device and in proximity of the connectors. In one or more embodiments of the invention, the communication medium includes the free space for optical or other wireless communication within the pre-determined 3D range. In one or more embodiments of the invention, the supplemental signal provides a common frequency and phase to synchronize the pluggable modules. In particular, the synchronization error is substantially less than the communication latency among the pluggable modules, in part due to the limited travel of the supplemental signal within the pre-determined 3D range and/or due to the substantially reduced buffering and elimination of multiple traffic streams competing for buffering resources of the supplemental signal path.

In Step 204, the communication latency among the pluggable modules is reduced or otherwise compensated by using the supplemental signal to enhance the pre-determined communication protocol. In particular, the communication latency for a packet stream traveling through the device via any ingress and egress pluggable modules is compensated.

In one or more embodiments of the invention, reducing or otherwise compensating the communication latency includes the following steps.

(a) A global timing packet stream of the computer network is received by a pluggable module (referred to as the ingress pluggable module) from a network path leading to the device in the computer network.

(b) The ingress pluggable module performs ingress timestamping using the common frequency and phase of the supplemental signal. For example, an ingress timestamp is inserted into the global timing packet stream. The ingress timestamp represents or otherwise corresponds to a time point when the timing packet stream is received by the ingress pluggable module. The ingress timestamping is performed before the ingress pluggable module passes the global timing packet stream to another pluggable module (referred to as the egress pluggable module) through the in-band channel of the device.

(c) The egress pluggable module receives the global timing packet stream and performs egress timestamping using the common frequency and phase of the supplemental signal. For example, an egress time stamp is inserted into the global timing packet stream. The egress timestamp represents or otherwise corresponds to a time point when the timing packet stream is received by the egress pluggable module through the in-band channel of the device.

(d) The ingress timestamp and egress timestamp are extracted by the egress pluggable module from the global timing packet. The extracted ingress timestamp and egress timestamp are then subtracted or otherwise compared to generate a difference, referred to as the residence time.

(e) The egress pluggable module uses the residence time to compensate the communication latency. In one or more embodiments, the egress pluggable module compensates the communication latency by updating a correction field in the global timing packet stream. Specifically, the residence time stored in the correction field is used to reduce, offset, or otherwise mitigate the communication latency or an effect of the communication latency, e.g., by a downstream device receiving, directly or indirectly, the global timing packet stream from the egress pluggable module. In one or more embodiments, the egress pluggable module compensates the communication latency by using the residence time to reduce, offset, or otherwise mitigate the communication latency or an effect of the communication latency in the egress data packet stream received through the in-band channel of the device. For example, the down stream device or the egress pluggable module may re-synchronize the egress data packet stream based on the residence time.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

Figure 8:
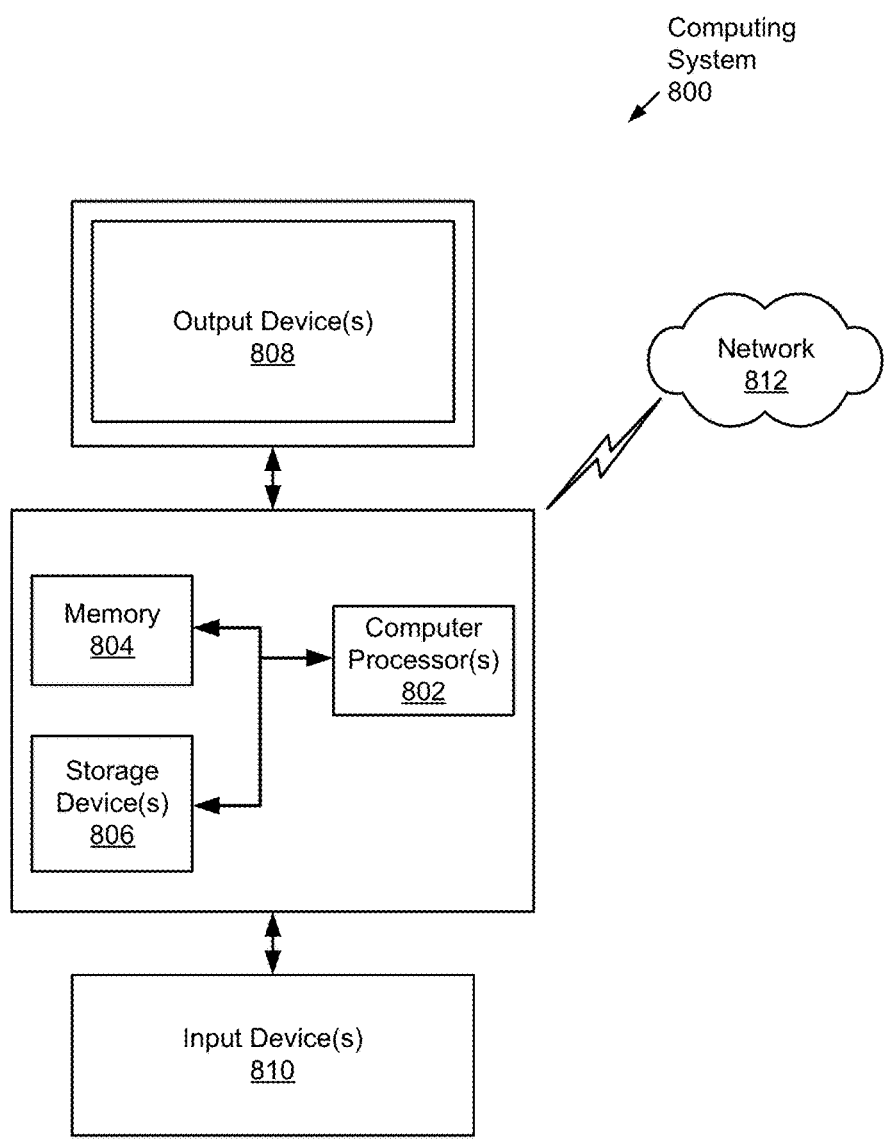
FIG. 8 shows a computer system in accordance with one or more embodiments of the invention.

For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The input and output device(s) may be locally or remotely connected to the computer processor(s) (802), memory (804), and storage device(s) (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other non-transitory computer readable storage medium. Specifically, the software instructions may correspond to computer readable program code that when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
   a device comprising a plurality of connectors connected to a plurality of pluggable modules external to an enclosure of the device; and
   the plurality of pluggable modules exchanging signals with the device via the plurality of connectors, wherein the plurality of pluggable modules comprise a first pluggable module and a second pluggable module that further exchange a supplemental signal with each other, using at least a wireless signal connection, bypassing the plurality of connectors,
   wherein the first pluggable module and the second pluggable module exchange signals with the device via the plurality of connectors according to a pre-determined communication protocol, and
   wherein the supplemental signal indicates timing for use between the first pluggable module and the second pluggable module in compensation of communication latency between the first pluggable module and the second pluggable module.

2. The system of claim 1,
   wherein the plurality of connectors hold the plurality of pluggable modules in a rigid relative position to the device with mechanical stability, and
   wherein the first pluggable module and the second pluggable module are coupled within a pre-determined range of the wireless signal connection based on the rigid relative position.

3. The system of claim 1, further comprising:
a communication assembly peripheral to the device and in proximity of the plurality of connectors, wherein the communication assembly comprises:
   a first signal interface in proximity to a first connector of the plurality of connectors;
   a second signal interface in proximity to a second connector of the plurality of connectors; and
   a routing element configured to route the supplemental signal between the first signal interface and the second signal interface,
wherein the plurality of connectors hold the plurality of pluggable modules and the communication assembly in a rigid relative position to the device with mechanical stability,
wherein the first pluggable module connects to the first connector and transmits the supplemental signal to the first signal interface according to a first relative position secured by the mechanical stability, and
wherein the second pluggable module connects to the second connector and receives the supplemental signal from the second signal interface according to a second relative position secured by the mechanical stability.

4. The system of claim 3,
wherein the first pluggable module comprises a third signal interface that is held in proximity to the first signal interface according to the first relative position secured by the mechanical stability,
wherein the first pluggable module transmits the supplemental signal to the communication assembly via the first signal interface and the third signal interface that are coupled using a first proximity-based connection,
wherein the second pluggable module comprises a fourth signal interface that is held in proximity to the second signal interface according to the second relative position secured by the mechanical stability, and
wherein the second pluggable module receives the supplemental signal from the communication assembly via the second signal interface and the fourth signal interface that are coupled using a second proximity-based connection.

5. The system of claim 4,
wherein the first signal interface comprises an active circuit that receives wireless power transmission from the first pluggable module.

6. The system of claim 4,
wherein the communication assembly further comprises a plurality of through holes,
wherein the plurality of pluggable modules penetrate the plurality of through holes to connect to the plurality of connectors,
wherein the first signal interface is further in proximity to a first through hole of the plurality of through holes that is penetrated by the first pluggable module,
wherein the second signal interface is further in proximity to a second through hole of the plurality of through holes that is penetrated by the second pluggable module, and
wherein the first proximity-based connection and the second proximity-based connection are based on the wireless signal connection.

7. The system of claim 6,
wherein the communication assembly further comprises a printed circuit board having the plurality of through holes,
wherein the first signal interface, the second signal interface, and the routing element are mounted on the printed circuit board, and
wherein the supplemental signal comprises a wireless electrical signal.

8. The system of claim 6,
wherein the communication assembly further comprises a light pipe assembly having the plurality of through holes, and
wherein the first signal interface, the second signal interface, and the routing element are integrated in the light pipe assembly, and wherein the supplemental signal comprises a guided optical signal.

9. A system, comprising:
a device comprising:
   an enclosure;
   a backplane internal to the device, and
   a plurality of connectors connected to a plurality of pluggable modules external to the enclosure of the device;
the plurality of pluggable modules exchanging signals with the device via the plurality of connectors and the backplane according to a pre-determined communication protocol; and
a communication assembly peripheral to the device and in proximity of the plurality of connectors, wherein the communication assembly is configured to:
   exchange a supplemental signal among the plurality of pluggable modules and bypassing the plurality of connectors and the backplane, and
   compensate a communication latency among the plurality of pluggable modules and the device by using the supplemental signal to enhance the pre-determined communication protocol,
wherein at least one of the plurality of pluggable modules uses the supplemental signal to synchronize time stamping of at least one of the signals exchanged between the device and the plurality of pluggable modules.

10. The system of claim 9, wherein the communication assembly comprises:
a first signal interface in proximity to a first connector of the plurality of connectors;
a second signal interface in proximity to a second connector of the plurality of connectors; and
a routing element configured to route the supplemental signal between the first signal interface and the second signal interface,
wherein a first pluggable module of the plurality of pluggable modules connects to the first connector and transmits the supplemental signal to the communication assembly according to a first relative position, secured by the mechanical stability, to the first signal interface, and
wherein a second pluggable module of the plurality of pluggable modules connects to the second connector and receives the supplemental signal from the communication assembly according to a second relative position, secured by the mechanical stability, to the second signal interface.

11. The system of claim 10,
wherein the first pluggable module comprises a third signal interface that is held in proximity to the first signal interface according to the first relative position secured by the mechanical stability, and
wherein the first pluggable module transmits the supplemental signal to the communication assembly via the first signal interface and the third signal interface that are coupled using a first proximity-based connection.

12. The system of claim 11,
wherein the first signal interface comprises an active circuit that receives wireless power transmission from the first pluggable module.

13. The system of claim 11,
wherein the second pluggable module comprises a fourth signal interface that is held in proximity to the second signal interface according to the second relative position secured by the mechanical stability,
wherein the first proximity-based connection transmits a first copy of the supplemental signal via the first signal interface, the second signal interface, the third signal interface, and the fourth signal interface,
wherein a second proximity-based connection transmits a second copy of the supplemental signal via the first signal interface, the second signal interface, the third signal interface, and the fourth signal interface, and
wherein the first copy of the supplemental signal and the second copy of the supplemental signal are redundant to each other in a failover operation.

14. The system of claim 11,
wherein the communication assembly further comprises a plurality of through holes,
wherein the plurality of pluggable modules penetrate the plurality of through holes to connect to the plurality of connectors,
wherein the first signal interface is further in proximity to a first through hole of the plurality of through holes that is penetrated by the first pluggable module,
wherein the second signal interface is further in proximity to a second through hole of the plurality of through holes that is penetrated by the second pluggable module, and
wherein the first proximity-based connection and the second proximity-based connection are based on a wireless signal connection.

15. The system of claim 11,
wherein the communication assembly further comprises a printed circuit board having the plurality of through holes,
wherein the first signal interface, the second signal interface, and the routing element are mounted on the printed circuit board, and
wherein the supplemental signal comprises a wireless electrical signal.

16. The system of claim 11,
wherein the communication assembly further comprises a light pipe assembly having the plurality of through holes, and
wherein the first signal interface, the second signal interface, and the routing element are integrated in the light pipe assembly, and
wherein the supplemental signal comprises an optical signal.

17. A method, comprising:
connecting, using a plurality of connectors of a device, the device to a plurality of pluggable modules external to an enclosure of the device, wherein the device comprises a backplane internal to the device;
holding, using the plurality of connectors, the plurality of pluggable modules in a rigid relative position to the device with mechanical stability;
exchanging, based on a pre-determined communication protocol, signals among the plurality of pluggable modules and the device via the plurality of connectors and the backplane;
further exchanging, via a communication assembly peripheral to the device and in proximity of the plurality of connectors, a supplemental signal among the plurality of pluggable modules and bypassing the plurality of connectors and the backplane;
synchronizing, using the supplemental signal, time stamping of at least one of the signals exchanged between the device and the plurality of pluggable modules; and
compensating, based on synchronizing the time stamping, a communication latency among the plurality of pluggable modules to enhance the pre-determined communication protocol.

18. The method of claim 17, wherein the communication assembly comprises:
a first signal interface in proximity to a first connector of the plurality of connectors;
a second signal interface in proximity to a second connector of the plurality of connectors; and
a routing element configured to route the supplemental signal between the first signal interface and the second signal interface,
wherein the method further comprises:
connecting a first pluggable module of the plurality of pluggable modules to the first connector;
transmitting the supplemental signal to the communication assembly according to a first relative position, secured by the mechanical stability, to the first signal interface;
connecting a second pluggable module of the plurality of pluggable modules to the second connector; and
receiving the supplemental signal from the communication assembly according to second relative position, secured by the mechanical stability, to the second signal interface.

19. The method of claim 18, further comprising:
holding a third signal interface of the first pluggable module in proximity to the first signal interface according to the first relative position secured by the mechanical stability; and
transmitting, by the first pluggable module, the supplemental signal to the communication assembly via the first signal interface and the third signal interface that are coupled using a first proximity-based connection.

20. The method of claim 17, further comprising:
receiving, by an active circuit of the first signal interface, wireless power transmission from the first pluggable module.

* * * * *